United States Patent [19]
Belsan et al.

[11] Patent Number: 5,410,667
[45] Date of Patent: Apr. 25, 1995

[54] DATA RECORD COPY SYSTEM FOR A DISK DRIVE ARRAY DATA STORAGE SUBSYSTEM

[75] Inventors: Jay S. Belsan, Nederland; Charles A. Milligan, Golden; John T. O'Brien, Louisville; George A. Rudeseal, Boulder, all of Colo.

[73] Assignee: Storage Technology Corporation, Louisville, Colo.

[21] Appl. No.: 870,573

[22] Filed: Apr. 17, 1992

[51] Int. Cl.[6] .............................................. G06F 12/00
[52] U.S. Cl. .............................. 395/425; 364/DIG. 2; 364/952; 364/952.1; 364/961; 395/600
[58] Field of Search ........................ 395/400, 425, 600; 371/10.1

[56] References Cited

U.S. PATENT DOCUMENTS 5,124,987 6/1992 Milligan et al. ................... 371/10.1

OTHER PUBLICATIONS

Patterson, D. A. et al. "Intro to redundant arrays of inexpensive disks (RAID)" COMPCON Spring '89 (IEEE Cat. No. 89CH2686-4) pp. 112-117.

Primary Examiner—Rebecca L. Rudolph
Attorney, Agent, or Firm—Duft, Graziano & Forest

[57] ABSTRACT

The disk drive array data storage subsystem maps between virtual and physical data storage devices and schedules the writing of data to these devices. The data storage subsystem functions as a conventional large form factor disk drive memory, using an array of redundancy groups, each containing N+M disk drives. This system copies data records by simply creating a duplicate data record pointer in a virtual track directory to reference the original data record. This enables the host processor to access the data record via two virtual addresses while only a single physical copy of the data record resides in the data storage subsystem.

40 Claims, 10 Drawing Sheets

DATA RECORD COPY SYSTEM FOR A DISK DRIVE ARRAY DATA STORAGE SUBSYSTEM

FIELD OF THE INVENTION

This invention relates to a disk drive array data storage subsystem that includes an efficient data storage management system which dynamically maps virtual data storage devices to physical data storage devices and can efficiently produce a copy of the data records stored on these devices.

Problem

It is a problem in the field of computer systems to provide an inexpensive, high performance, high reliability memory that can efficiently process changes to and create copies of the data records stored therein. This problem is especially severe in the case of disk drive memory systems. The typical commercially available disk drive is a 10.8-inch form factor unit, such as the IBM 3390-3 disk drive, that is a dual-actuator unit divided into two sections per spindle. The data storage capacity of the IBM 3390-3 disk drive is 5.7 gigabytes of data, with each section being equipped with a single actuator and storing on the order of 2.8 gigabytes of data. In order to improve the host processor access time to the most frequently used data stored on the disk drive, cached DASD controllers, such as the IBM 3990 Model 3 Storage Control, are used to interconnect a plurality of these disk drives with the host processors. Modifications to the data records stored on the disk drives are typically performed in the cache memory and each modified data record is then rewritten into its designated location on the disk drives. The associated host processor typically stores data files on the disk drive memory by writing an entire data file onto a single disk drive. In these typical disk drive memory systems, there is a fixed mapping of data storage addresses used by the associated host processor to physical locations on the disk drive memory. This simplifies the data storage management that must be done by the disk storage control.

An alternative to the large form factor disk drives for storing data is the use of a multiplicity of small form factor disk drives interconnected in a parallel array. The plurality of disk drives are divided into a number of redundancy groups, each of which includes a plurality of disk drives to spread the data transfers across all disk drives within the redundancy group rather than writing data to a single disk drive. A predetermined portion of the disk storage space in each redundancy group is used to store redundancy data to protect the integrity of the data stored in the redundancy group in the event of the failure of one or more of the physical disk drive included therein.

Two significant difficulties with both large form factor disk drives and disk drive array data storage subsystems are the time required to make copies of data records and the need to maintain the consistency of the data records during the time it takes to make copies of the data records. This is a significant issue when a copy must be made of a large group of data records or data bases which are the target of a single or common application programs. The data copy is typically made for backup purposes although copies can be made for editing or other purposes. In addition, the creation and maintenance of multiple copies of data records occupies a significant quantity of available memory space.

Solution

The above described problems are solved and a technical advance achieved in the field by the instant copy system for a disk drive array data storage subsystem which uses a large plurality of small form factor disk drives to implement an inexpensive, high performance, high reliability disk drive memory to emulate the format and capability of large form factor disk drives. This system avoids the data record copy problems of the prior art by simply creating a duplicate data record pointer in a virtual track directory to reference a data record that a host processor has requested the data storage subsystem to copy. This enables the host processor to access the data record via two virtual addresses while only a single physical copy of the data record resides in the data storage system.

The plurality of disk drives in the disk drive array data storage subsystem are configured into a plurality of variable size redundancy groups of $N+M$ parallel connected disk drives to store data thereon. The disk drive array data storage subsystem dynamically maps between three abstract layers: virtual, logical and physical. The virtual layer functions as a conventional large form factor disk drive memory. The logical layer functions as an array of storage units that are grouped into a plurality of redundancy groups, each containing $N+M$ physical disk drives. The physical layer functions as a plurality of individual small form factor disk drives. A controller in the data storage subsystem operates to effectuate the dynamic mapping of data among these abstract layers and to control the allocation and management of the actual space on the physical devices. These data storage management functions are performed in a manner that renders the operation of the disk drive array data storage subsystem transparent to the host processor which perceives only the virtual image of the data storage subsystem.

The performance of this system is enhanced by the use of a cache memory with both volatile and nonvolatile portions and "backend" data staging and destaging processes. Data received from the host processors is stored in the cache memory in the form of modifications to data already stored in the redundancy groups of the data storage subsystem. No data stored in a redundancy group is modified. A virtual track is staged from a redundancy group into cache. The host processor then modifies some, perhaps all, of the data records on the virtual track. Then, as determined by cache replacement algorithms such as Least Recently Used, etc, the modified virtual track is selected to be destaged to a redundancy group. When thus selected, a virtual track is divided (marked off) into several physical sectors to be stored on one or more physical tracks of one or more logical tracks. A complete physical track may contain physical sectors from one or more virtual tracks. Each physical track is combined with N-1 other physical tracks to form the N data segments of a logical track.

The original, unmodified data is simply flagged as obsolete. Obviously, as data is modified, the redundancy groups increasingly contain numerous virtual tracks of obsolete data. The remaining valid virtual tracks in a logical cylinder are read to the cache memory in a background "free space collection" process. They are then written to a previously emptied logical cylinder and the "collected" logical cylinder is tagged as being empty. Thus, all redundancy data creation, writing and free space collection occurs in background, rather than on-demand processes. This arrangement avoids the parity update problem of existing disk array systems and improves the response time versus access rate performance of the data storage subsystem by transferring these overhead tasks to background processes.

Each of these processes are impacted by the data record copy operation. For example, the free space collection process must know when a virtual track instance recorded on a logical device is no longer pointed to by any virtual track directory entry and may be treated as free space. A copy table or pointer ring can be used to list all virtual track directory entries which point to the same virtual track instance. These methods keep track of each virtual track instance to ensure data integrity.

DETAILED DESCRIPTION OF THE DRAWING

Figure 1:
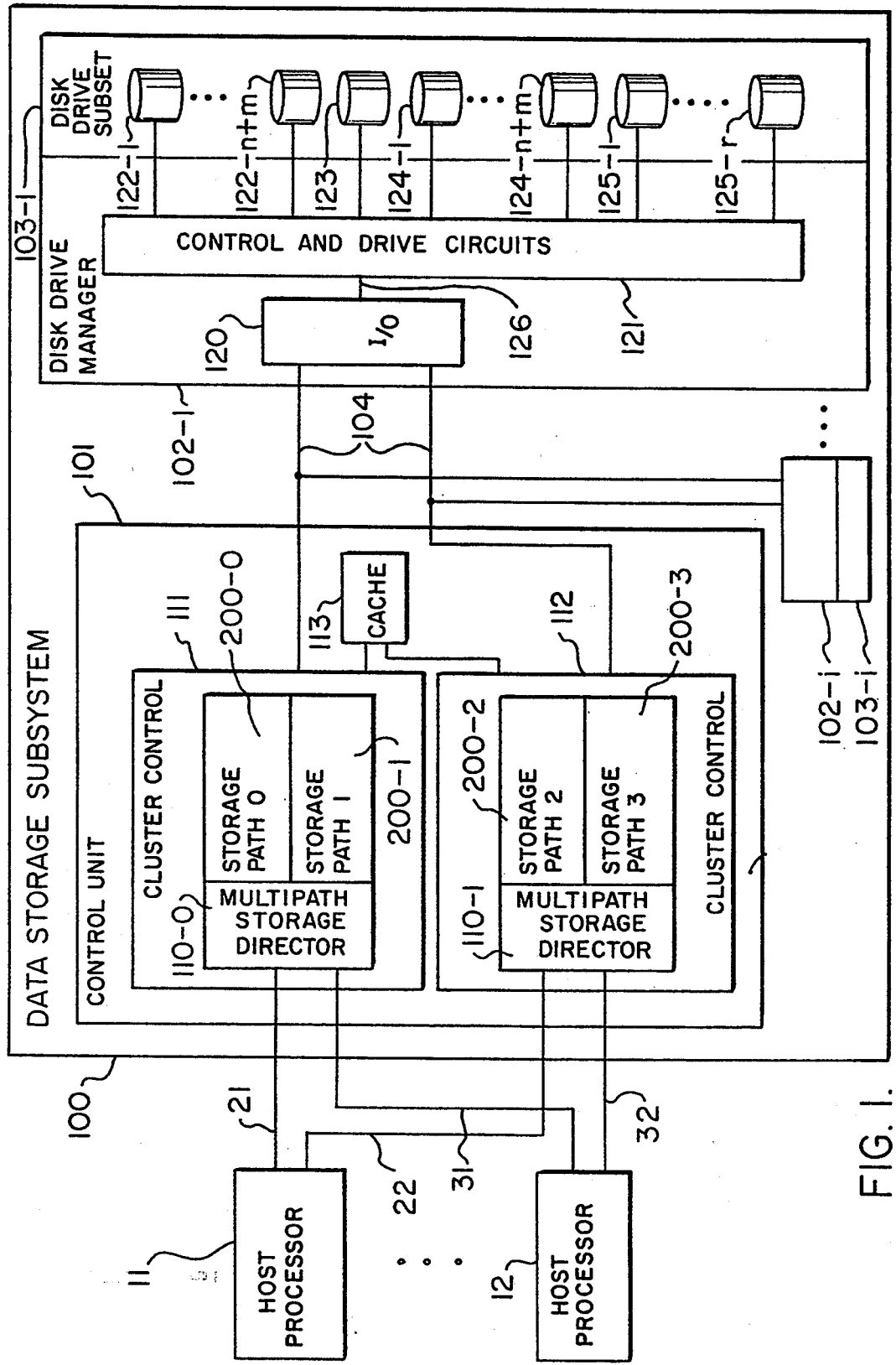
FIG. 1 illustrates in block diagram form the architecture of the disk drive array data storage subsystem.

The data storage subsystem of the present invention uses a plurality of small form factor disk drives in place of a single large form factor disk drive to implement an inexpensive, high performance, high reliability disk drive memory that emulates the format and capability of large form factor disk drives.

The plurality of disk drives in the disk drive array data storage subsystem are configured into a plurality of variable size redundancy groups of N+M connected disk drives to store data thereon. Each redundancy group, also called a logical disk drive, is divided into a number of logical cylinders, each containing i logical tracks, one logical track for each of the i physical tracks contained in a cylinder of one physical disk drive. Each logical track is comprised of N+M physical tracks, one physical track from each disk drive in the redundancy group. The N+M disk drives are used to store N data segments, one on each of N physical tracks per logical track, and to store M redundancy segments, one on each of M physical tracks per logical track in the redundancy group. The N+M disk drives in a redundancy group have unsynchronized spindles and loosely coupled actuators. The data is transferred to the disk drives via independent reads and writes since all disk drives operate independently. Furthermore, the M redundancy segments, for successive logical cylinders, are distributed across all the disk drives in the redundancy group rather than using dedicated redundancy disk drives.

The disk drive array data storage subsystem includes a controller that dynamically maps between three abstract layers: virtual, logical and physical. The virtual layer functions as a conventional large form factor disk drive memory. The logical layer functions as an array of storage units that are grouped into a plurality of redundancy groups, each containing N+M physical disk drives. The physical layer functions as a plurality of individual small form factor disk drives. The controller effectuates the dynamic mapping of data among these abstract layers and controls the allocation and management of the actual space on the physical devices. These data storage management functions are performed in a manner that renders the operation of the data storage subsystem transparent to the host processor, which perceives only the virtual image of the data storage subsystem.

The performance of this system is enhanced by the use of a cache memory with both volatile and non-volatile portions and "backend" data staging and de-staging processes. Data received from the host processors is stored in the cache memory in the form of modifications to data already stored in the redundancy groups of the data storage subsystem. No data stored in a redundancy group is modified. A virtual track is staged from a redundancy group into cache. The host then modifies some, perhaps all, of the records on the virtual track. Then, as determined by cache replacement algorithms such as Least Recently Used, etc, the modified virtual track is selected to be destaged to a redundancy group. When thus selected, a virtual track is divided (marked off) into several physical sectors to be stored on one or more physical tracks of one or more logical tracks. A complete physical track may contain physical sectors from one or more virtual tracks. Each physical track is combined with N-1 other physical tracks to form the N data segments of a logical track.

The original, unmodified data is simply flagged as obsolete. Obviously, as data is modified, the redundancy groups increasingly contain numerous virtual tracks of obsolete data. The remaining valid virtual tracks in a logical cylinder are read to the cache memory in a background "free space collection" process. They are then written to a previously emptied logical cylinder and the "collected" logical cylinder is tagged as being empty. Thus, all redundancy data creation, writing and free space collection occurs in background, rather than on-demand processes. This arrangement avoids the parity update problem of existing disk array systems and improves the response time versus access rate performance of the data storage subsystem by transferring these overhead tasks to background processes.

Data Storage Subsystem Architecture

FIG. 1 illustrates in block diagram form the architecture of the preferred embodiment of the disk drive array data storage subsystem 100. The disk drive array data storage subsystem 100 appears to the associated host processors 11–12 to be a collection of large form factor disk drives with their associated storage control, since the architecture of disk drive array data storage subsystem 100 is transparent to the associated host processors 11–12. This disk drive array data storage subsystem 100 includes a plurality of disk drives (ex 122-1 to 125-r) located in a plurality of disk drive subsets 103-1 to 103-i. The disk drives 122-1 to 125-r are significantly less expensive, even while providing disk drives to store redundancy information and providing disk drives for backup purposes, than the typical 10.8 inch form factor disk drive with an associated backup disk drive. The plurality of disk drives 122-1 to 125-r are typically the commodity hard disk drives in the 5¼ inch form factor.

The architecture illustrated in FIG. 1 is that of a plurality of host processors 11–12 interconnected via the respective plurality of data channels 21, 22–31, 32, respectively to a data storage subsystem 100 that provides the backend data storage capacity for the host processors 11–12. This basic configuration is well known in the data processing art. The data storage subsystem 100 includes a control unit 101 that serves to interconnect the subsets of disk drives 103-1 to 103-i and their associated drive managers 102-1 to 102-i with the data channels 21–22, 31–32 that interconnect data storage subsystem 100 with the plurality of host processors 11, 12.

Control unit 101 includes typically two cluster controls 111, 112 for redundancy purposes. Within a cluster control 111 the multipath storage director 110-0 provides a hardware interface to interconnect data channels 21, 31 to cluster control 111 contained in control unit 101. In this respect, the multipath storage director 110-0 provides a hardware interface to the associated data channels 21, 31 and provides a multiplex function to enable any attached data channel (for example 21) from any host processor (for example 11) to interconnect to a selected cluster control 111 within control unit 101. The cluster control 111 itself provides a pair of storage paths 201-0, 201-1 which function as an interface to a plurality of optical fiber backend channels 104. In addition, the cluster control 111 includes a data compression function as well as a data routing function that enables cluster control 111 to direct the transfer of data between a selected data channel 21 and cache memory 113, and between cache memory 113 and one of the connected optical fiber backend channels 104. Control unit 101 provides the major data storage subsystem control functions that include the creation and regulation of data redundancy groups, reconstruction of data for a failed disk drive, switching a spare disk drive in place of a failed disk drive, data redundancy generation, logical device space management, and virtual to logical device mapping. These subsystem functions are discussed in further detail below.

Disk drive manager 102-1 interconnects the plurality of commodity disk drives 122-1 to 125-r included in disk drive subset 103-1 with the plurality of optical fiber backend channels 104. Disk drive manager 102-1 includes an input/output circuit 120 that provides a hardware interface to interconnect the optical fiber backend channels 104 with the data paths 126 that serve control and drive circuits 121. Control and drive circuits 121 receive the data on conductors 126 from input/output circuit 120 and convert the form and format of these signals as required by the associated commodity disk drives in disk drive subset 103-1. In addition, control and drive circuits 121 provide a control signalling interface to transfer signals between the disk drive subset 103-1 and control unit 101.

The data that is written onto the disk drives in disk drive subset 103-1 consists of data that is transmitted from an associated host processor 11 over data channel 21 to one of cluster controls 111, 112 in control unit 101. The data is written into, for example, cluster control 111 which stores the data in cache 113. Cluster control 111 stores N physical tracks of data in cache 113 and then generates M redundancy segments for error correction purposes. Cluster control 111 then selects a subset of disk drives (122-1 to 122-n+m) to form a redundancy group to store the received data. Cluster control 111 selects an empty logical track, consisting of N+M physical tracks, in the selected redundancy group. Each of the N physical tracks of the data are written onto one of N disk drives in the selected data redundancy group. An additional M disk drives are used in the redundancy group to store the M redundancy segments. The M redundancy segments include error correction characters and data that can be used to verify the integrity of the N physical tracks that are stored on the N disk drives as well as to reconstruct one or more of the N physical tracks of the data if that physical track were lost due to a failure of the disk drive on which that physical track is stored.

Thus, data storage subsystem 100 can emulate one or more large form factor disk drives (for example—an IBM 3390-3 type of disk drive) using a plurality of smaller form factor disk drives while providing a high reliability capability by writing the data across a plurality of the smaller form factor disk drives. A reliability improvement is also obtained by providing a pool of R backup disk drives (125-1 to 125-r) that are switchably interconnectable in place of a failed disk drive. Data reconstruction is accomplished by the use of the M redundancy segments, so that the data stored on the remaining functioning disk drives combined with the redundancy information stored in the redundancy segments can be used by control software in control unit 101 to reconstruct the data lost when one or more of the plurality of disk drives in the redundancy group fails (122-1 to 122-n+m). This arrangement provides a reliability capability similar to that obtained by disk shadowing arrangements at a significantly reduced cost over such an arrangement.

Control Unit

Figure 2:
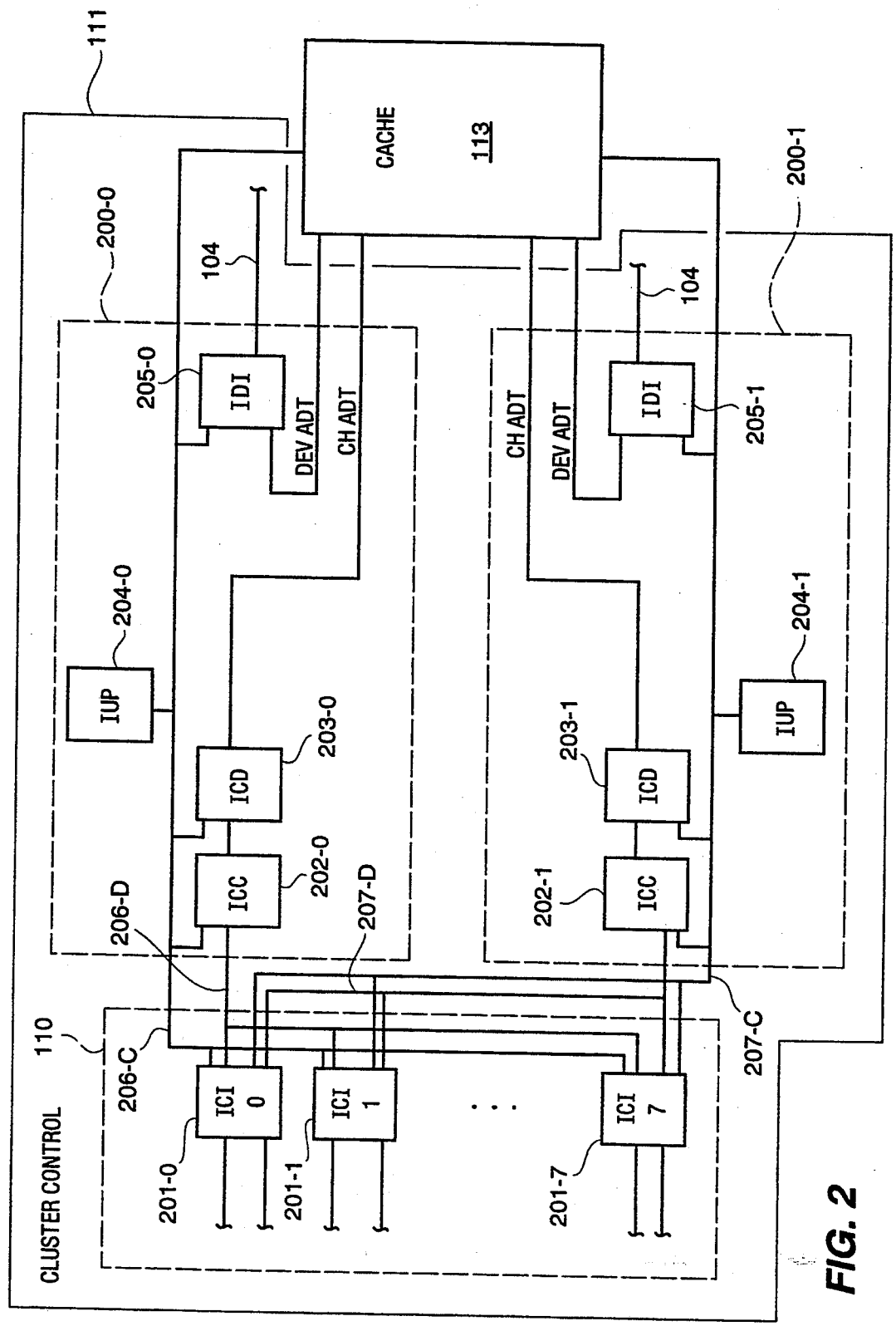
FIG. 2 illustrates the cluster control of the data storage subsystem.

FIG. 2 illustrates in block diagram form additional details of cluster control 111. Multipath storage director 110 includes a plurality of channel interface units 201-0 to 201-7, each of which terminates a corresponding pair of data channels 21, 31. The control and data signals received by the corresponding channel interface unit 201-0 are output on either of the corresponding control and data buses 206-C, 206-D, or 207-C, 207-D, respectively, to either storage path 200-0 or storage path 200-1. Thus, as can be seen from the structure of the cluster control 111 illustrated in FIG. 2, there is a significant amount of symmetry contained therein. Storage path 200-0 is identical to storage path 200-1 and only one of these is described herein. The multipath storage director 110 uses two sets of data and control busses 206-D, C and 207-D, C to interconnect each channel interface unit 201-0 to 201-7 with both storage path 200-0 and 200-1 so that the corresponding data channel 21 from the associated host processor 11 can be switched via either storage path 200-0 or 200-1 to the plurality of optical fiber backend channels 104. Within storage path 200-0 is contained a processor 204-0 that regulates the operation of storage path 200-0. In addition, an optical device interface 205-0 is provided to convert between the optical fiber signalling format of optical fiber backend channels 104 and the metallic conductors contained within storage path 200-0. Channel interface control 202-0 operates under control of processor 204-0 to control the flow of data to and from cache memory 113 and one of the channel interface units 201 that is presently active with storage path 200-0. The channel interface control 202-0 includes a cyclic redundancy check (CRC) generator/checker to generate and check the CRC bytes for the received data. The channel interface circuit 202-0 also includes a buffer that compensates for speed mismatch between the data transmission rate of the data channel 21 and the available data transfer capability of the cache memory 113. The data that is received by the channel interface control circuit 202-0 from a corresponding channel interface circuit 201 is forwarded to the cache memory 113 via channel data compression circuit 203-0. The channel data compression circuit 203-0 provides the necessary hardware and microcode to perform compression of the channel data for the control unit 101 on a data write from the host processor 11. It also performs the necessary decompression operation for control unit 101 on a data read operation by the host processor 11.

As can be seen from the architecture illustrated in FIG. 2, all data transfers between a host processor 11 and a redundancy group in the disk drive subsets 103 are routed through cache memory 113. Control of cache memory 113 is provided in control unit 101 by processor 204-0. The functions provided by processor 204-0 include initialization of the cache directory and other cache data structures, cache directory searching and management, cache space management, cache performance improvement algorithms as well as other cache control functions. In addition, processor 204-0 creates the redundancy groups from the disk drives in disk drive subsets 103 and maintains records of the status of those devices. Processor 204-0 also causes the redundancy data across the N data disks in a redundancy group to be generated within cache memory 113 and writes the M segments of redundancy data onto the M redundancy disks in the redundancy group. The functional software in processor 204-0 also manages the mappings from virtual to logical and from logical to physical devices. The tables that describe this mapping are updated, maintained, backed up and occasionally recovered by this functional software on processor 204-0. The free space collection function is also performed by processor 204-0 as well as management and scheduling of the optical fiber backend channels 104. Many of these above functions are well known in the data processing art and are not described in any detail herein.

Dynamic Virtual Device to Logical Device Mapping

With respect to data transfer operations, all data transfers go through cache memory 113. Therefore, front end or channel transfer operations are completely independent of backend or device transfer operations. In this system, staging operations are similar to staging in other cached disk subsystems but destaging transfers are collected into groups for bulk transfers. In addition, this data storage subsystem 100 simultaneously performs free space collection, mapping table backup, and error recovery as background processes. Because of the complete front end/backend separation, the data storage subsystem 100 is liberated from the exacting processor timing dependencies of previous count key data disk subsystems. The subsystem is free to dedicate its processing resources to increasing performance through more intelligent scheduling and data transfer control.

When the host processor 11 transmits data over the data channel 21 to the data storage subsystem 100, the data is transmitted in the form of the individual records of a virtual track. In order to render the operation of the disk drive array data storage subsystem 100 transparent to the host processor 11, the received data is stored on the actual physical disk drives (122-1 to 122-n+m) in the form of virtual track instances which reflect the capacity of a track on the large form factor disk drive that is emulated by data storage subsystem 100. Although a virtual track instance may spill over from one physical track to the next physical track, a virtual track instance is not permitted to spill over from one logical cylinder to another. This is done in order to simplify the management of the memory space.

When a virtual track is modified by the host processor 11, the updated instance of the virtual track is not rewritten in data storage subsystem 100 at its original location but is instead written to a new logical cylinder and the previous instance of the virtual track is marked obsolete. Therefore, over time a logical cylinder becomes riddled with "holes" of obsolete data known as free space. In order to create whole free logical cylinders, virtual track instances that are still valid and located among fragmented free space within a logical cylinder are relocated within the disk drive array data storage subsystem 100 in order to create entirely free logical cylinders. In order to evenly distribute data transfer activity, the tracks of each virtual device are scattered as uniformly as possible among the logical devices in the disk drive array data storage subsystem 100. In addition, virtual track instances are padded out if necessary to fit into an integral number of physical device sectors. This is to ensure that each virtual track instance starts on a sector boundary of the physical device.

Mapping Tables

It is necessary to accurately record the location of all data within the disk drive array data storage subsystem 100 since the data received from the host processors 11-12 is mapped from its address in the virtual space to a physical location in the subsystem in a dynamic fashion. A virtual track directory is maintained to recall the location of the present instance of each virtual track in disk drive array data storage subsystem 100. Changes to the virtual track directory are journaled to a non-volatile store and are backed up with fuzzy image copies to safeguard the mapping data. The virtual track directory 3 consists of an entry 300 (FIG. 3) for each virtual track which the associated host processor 11 can address. The virtual track directory entry 300 also contains data 307 indicative of the length of the virtual track instance in sectors. The virtual track directory 3 is stored in noncontiguous pieces of the cache memory 113 and is addressed indirectly through pointers in a virtual device table. The virtual track directory 3 is updated whenever a new virtual track instance is written to the disk drives.

The storage control also includes a free space directory 800 (FIG. 8) which is a list of all of the logical cylinders in the disk drive array data storage subsystem 100 ordered by logical device. Each logical device is cataloged in a list called a free space list 801 for the logical device; each list entry represents a logical cylinder and indicates the amount of free space that this logical cylinder presently contains. This free space directory contains a positional entry for each logical cylinder; each entry includes both forward 802 and backward 803 pointers for the doubly linked free space list 801 for its logical device and the number of free sectors contained in the logical cylinder. Each of these pointers 802, 803 points either to another entry in the free space list 801 for its logical device or is null. The collection of free space is a background process that is implemented in the disk drive array data storage subsystem 100. The free space collection process makes use of the logical cylinder directory, which is a list contained in the last few sectors of each logical cylinder indicative of the contents of that logical cylinder. The logical cylinder directory contains an entry for each virtual track instance contained within the logical cylinder. The entry for each virtual track instance contains the identifier of the virtual track instance and the identifier of the relative sector within the logical cylinder in which the virtual track instance begins. From this directory and the virtual track directory, the free space collection process can determine which virtual track instances are still current in this logical cylinder and therefore need to be moved to another location to make the logical cylinder available for writing new data.

Data Move/Copy Operation

The data record move/copy operation instantaneously relocates or creates a second instance of a selected data record by merely generating a new pointer to reference the same physical memory location as the original reference pointer in the virtual track directory. In this fashion, by simply generating a new pointer referencing the same physical memory space, the data record can be moved/copied.

This apparatus instantaneously moves the original data record without the time penalty of having to download the data record to the cache memory 113 and write the data record to a new physical memory location. For the purpose of enabling a program to simply access the data record at a different virtual address, the use of this mechanism provides a significant time advantage. A physical copy of the original data record can later be written as a background process to a second memory location, if so desired. Alternatively, when one of the programs that can access the data record writes data to or modifies the data record in any way, the modified copy of a portion of the original data record is written to a new physical memory location and the corresponding address pointers are changed to reflect the new location of this rewritten portion of the data record.

In this fashion, a data record can be instantaneously moved/copied by simply creating a new memory pointer and the actual physical copying of the data record can take place either as a background process or incrementally as necessary when each virtual track of the data record is modified by one of the programs that accesses the data record. This data record copy operation can be implemented in a number of different ways. A first method of manipulating memory pointers is to use a lookaside copy table which functions as a map to be used by the data storage subsystem 100 to list all the data records that are accessible by more than one virtual address. A second method of manipulating data record pointers is to provide additional data in the virtual track directory 3 in order to record the copy status of each data record therein. These two methods each have advantages and disadvantages in the implementation of the data record pointer management function and are disclosed herein as implementations illustrative of the concept of this invention.

Copy Table Implementation

Each entry 300 in the Virtual Track Directory (VTD) 3 contains two flags associated with the Copy/Move function. The "Source" flag 306 is set whenever a Virtual Track Instance at this Virtual Track Address has been the origin of a copy or move. The Virtual Track Instance pointed to by this entry 300 is not necessarily the Source, but the Virtual Track Instance contains this Virtual Address. If the Source flag 306 is set, there is at least one entry in the Copy Table 400 (FIG. 4) for this Virtual Address. The "Target" flag 303 is set whenever a Virtual Track Instance contains data that has been the destination of a copy or move. If the Target flag 303 is set, the Virtual Address in the Virtual Track Instance that is pointed to is not that of the Virtual Track Directory Entry 300.

Figures 3, 4:
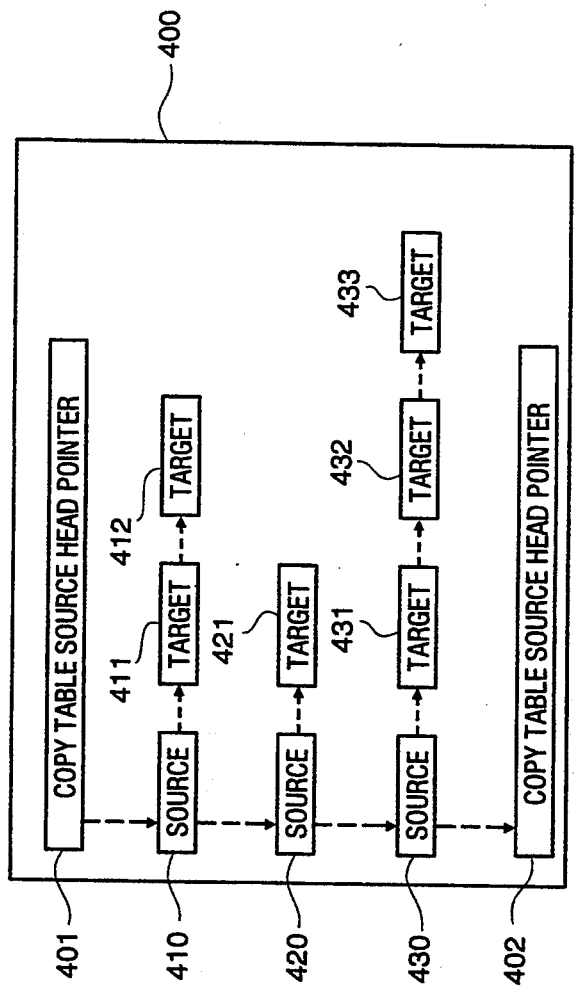
FIG. 3 illustrates the virtual track directory.
FIG. 4 illustrates the format of a copy table.
Figure 5:
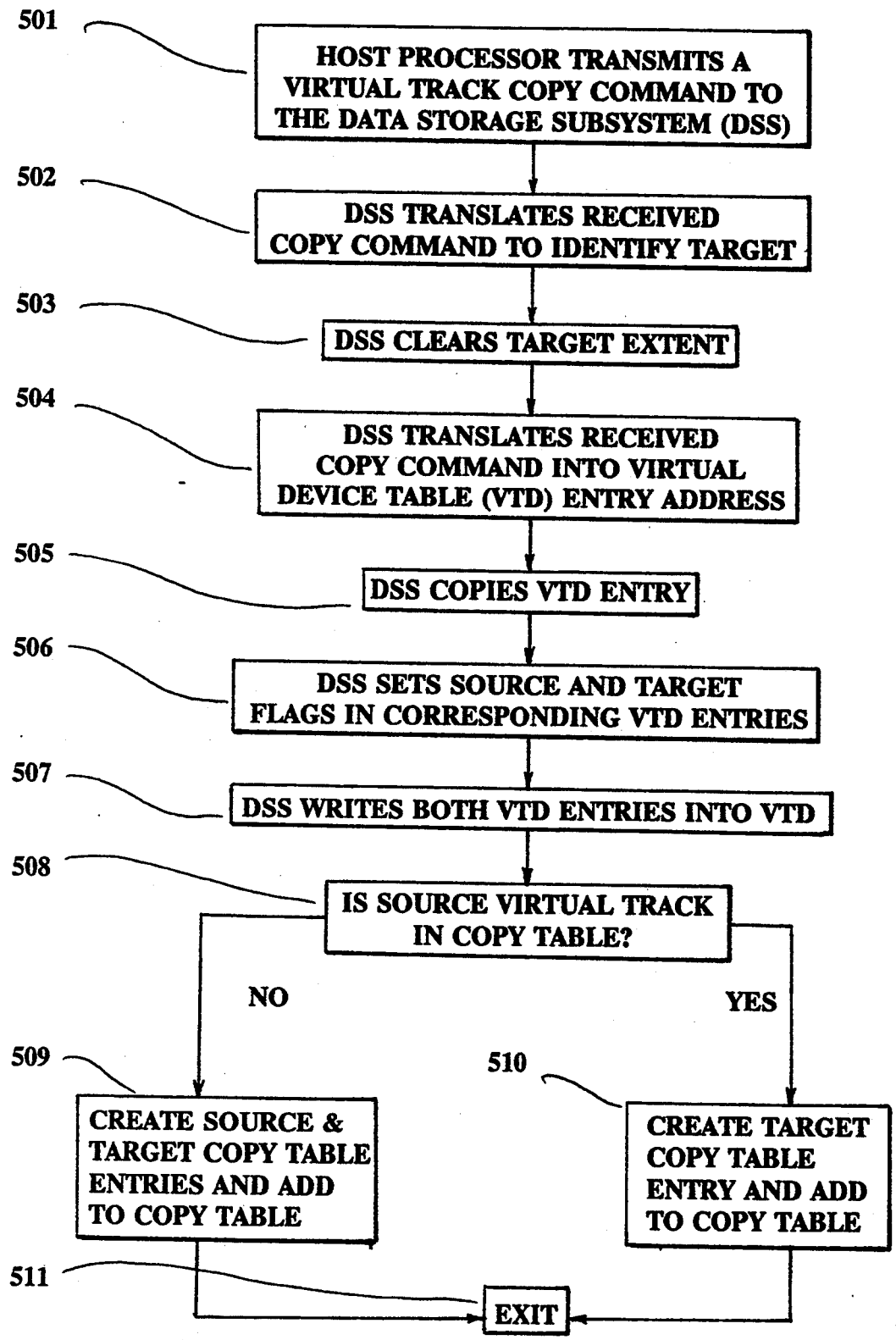
FIG. 5 illustrates in flow diagram form copy table implementation of a data record copy operation.

The format of the Copy Table 400 is illustrated graphically in FIG. 4. The preferred implementation is to have a separate lookaside Copy Table 400 for each Logical Device so that there is a Copy Table head 401 and tail 402 pointer associated with each Logical Device; however, the copy table 400 could just as easily be implemented as a single table for the entire data storage subsystem 100. In either case, the changes to the copy table 400 are journaled as noted above for the virtual track directory. The copy table is ordered such that the sources 4*0 are in ascending Logical Address order. The copy table 400 is a singly linked list of Sources 4*0 where each Source (such as 410) is the head of a linked list of Targets 411, 412. The Source Entry 410 contains the following data:

Logical Address (VTD Entry Copy)
Virtual Address
Next Source Pointer (NULL if last Source in list)
Target Pointer The Target Entry 411 contains the following data:
Virtual Address
Next Target Pointer (NULL if last Target in list)
Update Count Fields Flag Snapshot Copy Operation Using Copy Table FIG. 5 illustrates in flow diagram form the operational steps taken by data storage subsystem 100 to produce a copy of a virtual track instance (also referred to as data record) using the copy table implementation of the snapshot copy operation. When host processor 11 transmits a data copy request to data storage subsystem 100 over data link 21 at step 501, the control software in processor 204-0 for example translates the received data copy request into an identification of a particular virtual track directory entry 300 stored in cache memory 113 at step 502. Processor 204-0 in data storage subsystem 100 verifies at step 503 that the extents are defined, the same length and do not overlap. The cache management software ensures at step 504 that all the tracks in this target extent are cleared and available for the copy operation. Processor 204-0 reads the virtual track directory entry 300 and creates at step 505 a copy of this entry to be used as the virtual track directory entry for the target virtual track. At step 506 processor 204-0 sets the source 306 and target 303 flags respectively in the original and copied virtual track directory entries. Processor 204-0 then writes at step 507 the updated virtual track directory entry for the source virtual track back into the virtual track directory 3 as well as the new virtual track directory entry for the target virtual track into the virtual track directory 3. At step 508, a determination is made whether the source virtual track is already listed in copy table 400. If the source virtual track is not already a source or a target virtual track in copy table 400, then both the source entry and a target entry are created by processor 204-0 and written at step 509 into copy table 400 in the form noted above with respect to FIG. 4. If the source data record was already marked as a source or a target data record in copy table 400, then copy table 400 is scanned at step 510 in order to locate this entry and the target entry is added to this linked list to create a new target for this source data record. A more specific recitation of this process is illustrated in the following pseudo code:

---

Read VTD Entry for Source

Set Source Flag in VTD Entry

Write updated VTD Entry for Source back to VTD

Set Target Flag in a copy of the VTD Entry

Read VTD entry for Target

Increase Free Space for Cylinder pointed to by
  old VTD entry

Reorder Free List, if necessary

Write updated VTD Entry to Target location in
  VTD

Create Target Entry for the Copy Table
  Move the Update Count Fields Flag from the
    command to the Target Entry If Source is NOT already a Source or a Target
  Create Source Entry for Copy Table
  Link Source into proper location in Copy
    Table
  Link Target Entry to Source Entry in Copy
    Table Elseif (New Source was already marked as
  Source)
  Scan Source List to find source in copy
    Table
  If find Source
    Link Target to Last Target in this
      Source's Target List
  Else (scanned to end of Source List)
    Create Source Entry for Copy Table
    Link Source into proper location in
      source list
    Link Target Entry to Source Entry in
      Copy Table
  Endif
Else (New Source was already in Copy Table as
  Target)
  Scan Source List to find Logical Address of
    Target
  Link Target Entry to Last Target in this
    Source's Target List
Endif Journal the changes to the VTD and to the Copy
  Table

---

Moving a data record without a copy operation is functionally similar to the snapshot copy operation described above. A significant difference is that the virtual track directory entry 300 contains a NULL pointer in the virtual track address 20 to indicate that this virtual address does not contain any data and the source flag bit 306 is set to indicate that this virtual address is still a source. The following pseudo code listing indicates an instant move operation for a target data record, to highlight the difference between this operation and the above noted data record copy operation:

---

Read VTD Entry for New Target

-continued

Increase Free Space for Cylinder pointed to by
  old VTD Entry

Reorder Free List if necessary

Read VTD Entry for the Source

Set Source Flag in VTD Entry

Write a NULL pointer into the Logical Address
  Pointer of the VTD Entry

Write Updated VTD for Source back to VTD

Write an unmodified copy of the old VTD Entry
  to Target location in VTD
(This entry already has the Target Flag set)

Scan Source List for the Logical Address in the
  VTD Entry for the Target

Scan Target List to find this Target in Target
  List

Update the Target Entry to the address the data
  was moved to
  Move the Update Count Fields Flag from the
    command to the Target Entry Journal the changes to the VTD and to the Copy
  Table

---

Virtual Track Directory Copy Implementation

This second method of managing the data pointers makes use of an expanded virtual track directory 3 which increases each entry 300 to allow room for a virtual track address 320 that consists of copy virtual device number 308, copy virtual cylinder number 309 and copy virtual head number 310 elements which act as a pointer to another virtual track that was copied from the first virtual track. The virtual track directory entry for the track pointed to from the first virtual track directory entry contains the same logical address as the first and contains the virtual track address of the next virtual track directory entry in the chain of target data records. Thus, multiple tracks copied from a single source track are identified by a singly linked list that loops back to itself at the source track to form a synonym ring of pointers. Thus, the virtual track directory itself contains an embedded copy table instead of using the lookaside copy table described above. Theoretically, any number of copies of a single track can be made using this method since the virtual track directory entries are simply linked together in ring form. As a management construct, the number of copies can be limited to a predetermined number and, if a user requests further copies to be made, a second set of copies can be created by staging the data record from the backend data storage devices to make a second physical copy in cache memory 113 which can be used as the basis of a second ring in order to enable the length of each ring to be maintained at a reasonable manageable number.

Figure 10:
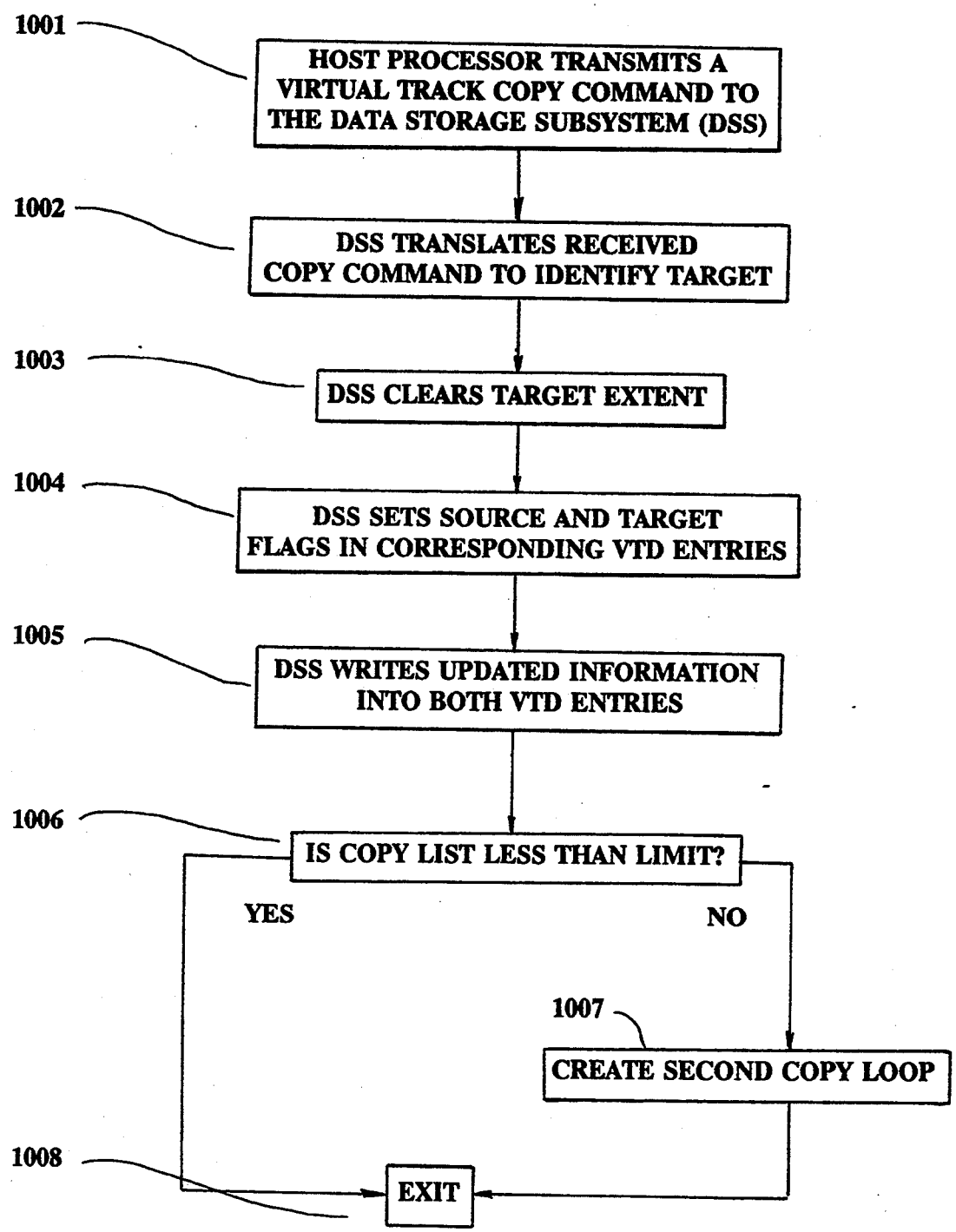
FIG. 10 illustrates in flow diagram form the virtual track directory implementation of a data record copy operation.

The operation of the virtual track directory implementation is illustrated in flow diagram form in FIG. 10. At step 1001, the data storage subsystem receives a copy request from host processor 11 over data channel 21. Processor 204-0 in data storage subsystem 100 verifies at step 1002 that the extents are defined, the same length and do not overlap. The cache management software ensures at step 1003 that all the tracks in this target extent are cleared and available for the copy operation.

This is explained in further detail in the following pseudo code:

```
For each track in source extent, search cache
   IF track is found
      Mark track as "Copy Loop Track"
      IF track is modified
         CALL Copy Modified Track service routine
            PASS Source Virtual Track Address
            PASS Target Virtual Track Address
         ;*  Function forms Copy Loop in VTD and
         ;*  marks target as "No Backend Address"
         ;*  IF Copy Loop is below Max Size
         ;*     RETURN (SUCCESS) ;* No Action
                  Necessary
         ;*  ELSE (Loop too big - Need to Break
         ;*     Mark Target as Pseudosource in VTD
                  Entry
         ;*     RETURN (Cache Copy to Target
                  Address and Destage Target)
         ;*  ENDIF
         RECEIVE Status
         ;*  Cache must do the following:
         ;*  IF status is Cache Copy to Target and
               Destage Target
         ;*     Do Not search for track - target
                  can't be in cache
         ;*     Do a Cache to Cache Copy of the
                  source
         ;*     Load the copy with the target
                  address
         ;*     Schedule the Destage of the track
         ;*  ENDIF
      ENDIF
   ENDIF
ENDFOR
```

Once this operation is completed, the source and target virtual track directory entries are updated at step 1004 to indicate their status as source and target, respectively and the virtual track address information contained therein is modified at step 1005 to indicate that both of these virtual track directory entries are part of a copy loop.

In order to limit the length of the singly linked list of source and target tracks in the copy operation, the length of the copy list is checked at step 1006 and if less than a predetermined limit, the task is completed. If the copy list exceeds this predetermined limit, then at step 1007 a second copy loop is created as described in the following copy count management code:

```
IF the loop is bigger than limit
   Set "Hold Off VCKD Response" flag
   Increment Copy Notify Count in Copy Command in
      Virtual Device Table
   IF any target is marked as Modified or as a
      pseudosource
      Mark Pseudosource as "Notify when Destaged"
      ;*  Destage Task will tell Copy Task when the
      ;*  destage is complete and the Loop Size is
            reduced
      CALL Destage Track Cache function
         PASS Virtual Track Address
         PASS No Response Indicator
   ELSE (No tracks are modified)
      Mark Target as Pseudosource in VTD Entry
         (Set Source and Target)
      Mark Target (Pseudosource) as "Notify when
         Destaged"
      CALL Stage and Destage Track cache service
         routine
         PASS Target Address
      ;*  Cache SW must hash to the passed address.
      ;*  IF the track is in cache
      ;*     Schedule the Destage of the track
      ;*  ELSE (Track is not in cache)
      ;*     Schedule the Stage of the track
      ;*     Once track is in cache, immediately
               schedule the Destage of the track
      ;*  ENDIF
      ;*  When track is destaged, Destage Task
            breaks Copy Loop
      ;*  into two Copy Loops with pseudosource as
            new source,
      ;*  and returns response to Copy Task.
   ENDIF
ENDIF
```

Staging and Destaging of Copy Loop Tracks

When a track is to be updated in cache memory 113, it must be determined whether this track is part of a copy loop. It is important to do this to ensure that the integrity of the multiple copies of this track are maintained and that only the appropriate copies of this track are modified according to the following procedure:

```
IF the track is not a Copy Loop
   RETURN (SUCCESS) ;* No action required by
      cache SW
ELSEIF (the track is a Target)
   IF the track marked as a Pseudosource in VTD
      RETURN (Do Not Update - Track Being
         Scheduled for Destage)
   ELSE
      Mark track as "Modified In Cache" in VTD
         Entry
      RETURN (SUCCESS) ;* No action required by
         cache SW
   ENDIF
ELSE (the track is a Source)
   Scan Copy Loop to find an unmodified target
   IF unmodified target found    ;* Could be
      marked "No Backend Address"
      Mark Target as Pseudosource in VTD Entry
         (Set Source and Target)
      RETURN (Cache Copy to Returned Address and
         Destage Returned Track)
      ;*  Cache SW must hash to the returned
      ;*  address.
      ;*  IF the track is in cache
      ;*     Schedule the Destage of the track
      ;*  ELSE (Track is not in cache)
      ;*     DO a Cache to Cache Copy of the source
      ;*     Load the copy with the returned
      ;*        address (Pseudosource address)
      ;*     Schedule the Destage of the track
      ;*  ENDIF
      ;*  Go ahead with modifications to the source
   ELSE (unmodified target not found)
      RETURN (Target List with an indicator to
         Destage Targets)
      ;*  Cache SW must hash to the passed
      ;*  addresses and
      ;*  schedule the Destage of all those tracks.
      ;*  Destage will not allow the source track
      ;*  to be
      ;*  destaged until all the targets are
      ;*  destaged first.
      ;*  The Cache SW can go ahead with
      ;*  modifications to the source
   ENDIF
ENDIF
```

As can be seen from this pseudo code, a cache to cache copy of the track must be made if this track is a source in a copy loop in order to ensure that the noted copies of this track are maintained at their present status and not corrupted by the modification to the original track performed by cache memory 113. Similarly, the destaging of copy loop tracks are performed in a manner to maintain the integrity of the copy loop and ensure that the proper vintage of data is written to the appropriate physical location in the backend data storage for the designated virtual address.

Figure 11:
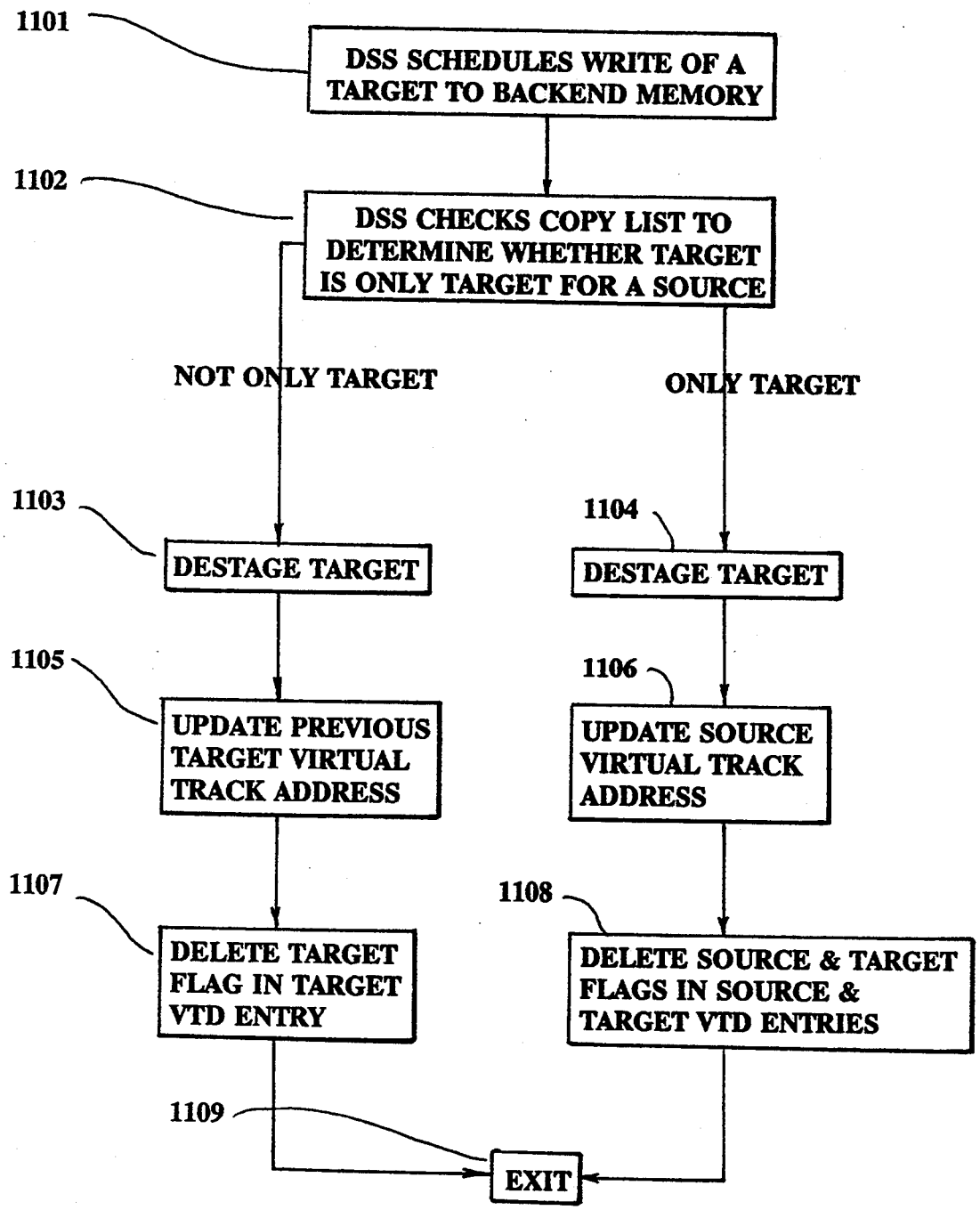
FIG. 11 illustrates in flow diagram form the steps taken to update the virtual track directory when a virtual track that was copied from another virtual track is written to the disk drives of a redundancy group.

FIG. 11 illustrates in flow diagram form the operational steps taken by processor 204-0 when at step 1101 it schedules the writing of a virtual track that is a target to the backend storage 103. At step 1102, a check is made of the copy list to determine whether the target is the only target for the associated source. If not, at step 1103, the target is destaged from cache memory 113 to backend storage 103 and the copy virtual track address 320 of the previous track in the copy list is updated to reflect the deletion of this target from the copy list. The target flag for the written target is reset at step 1107 to reflect the deletion of this target from the copy list. If this is the last target, at step 1104 it is destaged from cache memory 113 to backend storage 103. At step 1106, the source copy virtual track address 320 is deleted and the source and target flags are reset at step 1108 in the corresponding virtual track directory entries. The destaging algorithm for the copy list is described using the following pseudo code:

```
IF track is a source
  ;* There must be at least one target for track
  to be a source
  IF all targets marked as "No Backend Address"
    Write track to DASD
    Put Logical Address in Source and Targets in
      VTD
    Remove "No Backend Address" indication
  ELSEIF (any Targets marked as "Modified in
    Cache"
      AND Not marked "Scheduled for Destage")
    Create TCB containing:
      Destage Failure Indicator
      Targets Not Destaged First Indicator
      Addresses of targets modified in cache and
        not scheduled for destage
    CALL Cleanup Track cache service routine
      PASS TCB Pointer
    ;* The Targets mayin fact have been
    ;* scheduled for destage
    ;* following the scheduling of the source.
    ;* Cache SW must do following:
    ;* FOR (All target addresses returned to
    ;* cache)
    ;*   IF track not scheduled for destage
    ;*     CALL Destage Track Request
    ;*       PASS Returned Target Address
    ;*   ENDIF
    ;* ENDFOR
    ;* CALL Destage Track Request
    ;*   PASS Source Address
  ELSE (any Targets marked as "Modified in Cache"
      AND marked "Scheduled for Destage")
    Put Request on Destage Blocked Queue marked
      as
        "Do Not Destage until Modified Target
        Destaged"
  ENDIF ELSEIF (track is a pseudosource)
  Write track to DASD
  Update VTD to mark track as source
  Unlink previous source from Copy Loop
  Update Target Physical Addresses to new source
    location
  IF track marked as "Notify when Destage"
    CALL Notify Copy Task function
      PASS Target Virtual Address
  ENDIF EISEIF (track is a target)   ;* Must be modified
  Update VTD to mark track as "Scheduled for
    Destage"
  Write track to DASD
  IF track marked as "Notify when Destage"
    CALL Notify Copy Task function
      PASS Target Virtual Address
  ENDIF
  IF (this is the last modified target in the
    Copy Loop
    AND source is in Destage Blocked Queue marked
    as
      "Do Not Destage until Modified Target
      Destaged")
    Move source request to Destage Request Queue
    Write source track to DASD
  ENDIF
ENDIF
```

As can be seen from these routines, care must be taken to not intermingle various versions of the virtual track instances as the copy loop is created, expanded and contracted by the movement of data into and out of cache memory 113 and the appropriate backend storage. A corresponding destaging process is executed for a copy table implementation of the pointer management.

Data Read Operation

Figure 6:
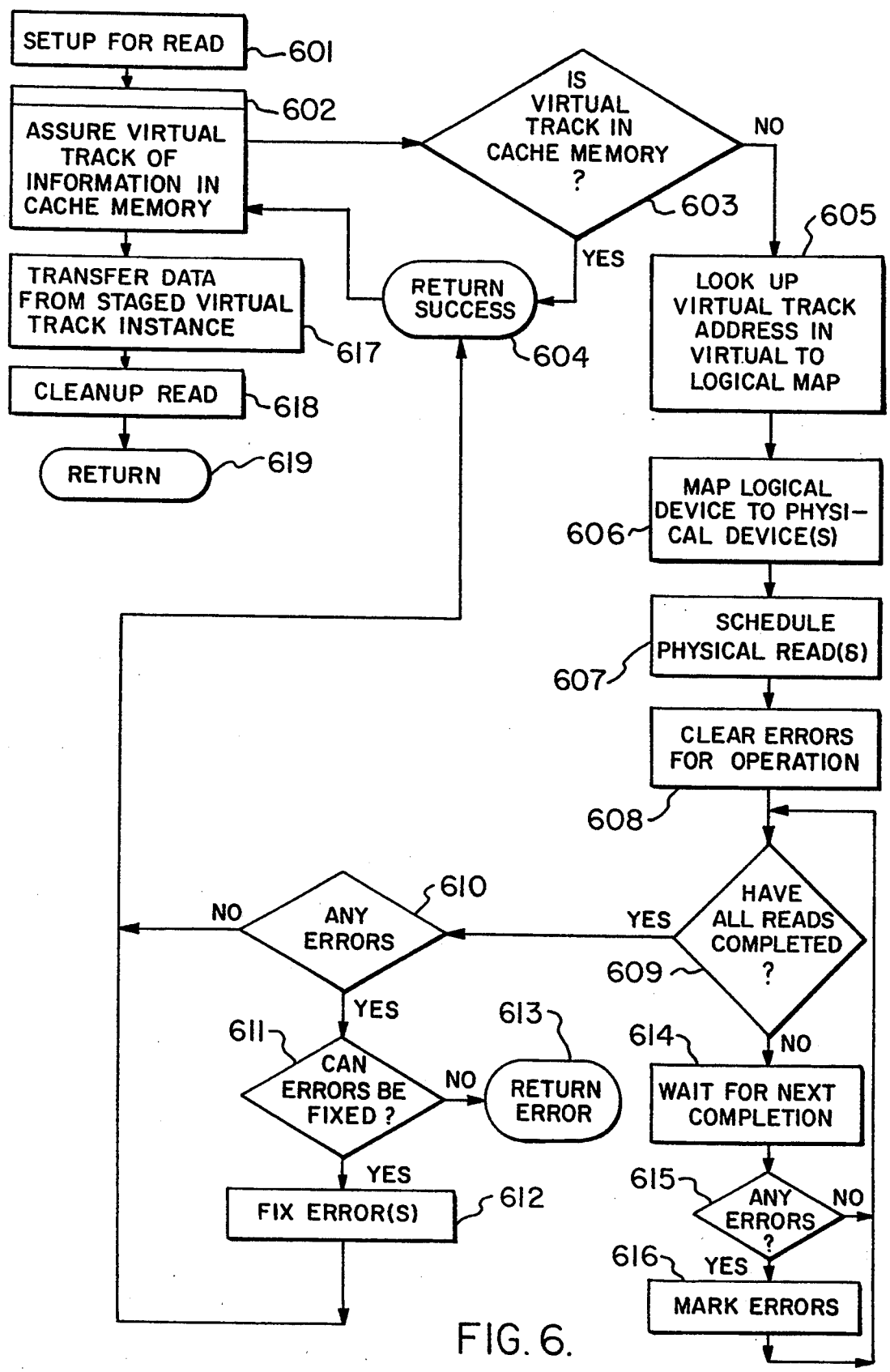
FIGS. 6 and 7 illustrate, in flow diagram form, the operational steps taken to perform a data read and write operation, respectively.

FIG. 6 illustrates in flow diagram form the operational steps taken by processor 204 in control unit 101 of the data storage subsystem 100 to read data from a data redundancy group 122-1 to 122-n+m in the disk drive subsets 103. The disk drive array data storage subsystem 100 supports reads of any size. However, the logical layer only supports reads of virtual track instances. In order to perform a read operation, the virtual track instance that contains the data to be read is staged from the logical layer into the cache memory 113. The data record is then transferred from the cache memory 113 and any clean up is performed to complete the read operation.

At step 601, the control unit 101 prepares to read a record from a virtual track. At step 602, the control unit 101 branches to the cache directory search subroutine to assure that the virtual track is located in the cache memory 113 since the virtual track may already have been staged into the cache memory 113 and stored therein in addition to having a copy stored on the plurality of disk drives (122-1 to 122-n+m) that constitute the redundancy group in which the virtual track is stored. At step 603, the control unit 101 scans the hash table directory of the cache memory 113 to determine whether the requested virtual track is located in the cache memory 113. If it is, at step 604 control returns back to the main read operation routine and the cache staging subroutine that constitutes steps 605–616 is terminated.

Assume, for the purpose of this description, that the virtual track that has been requested is not located in the cache memory 113. Processing proceeds to step 605 where the control unit 101 looks up the address of the virtual track in the virtual to logical map table. At step 606, the logical map location is used to map the logical device to one or more physical devices in the redundancy group. At step 607, the control unit 101 schedules one or more physical read operations to retrieve the virtual track instance from appropriate ones of identified physical devices 122-1 to 122-n+m. At step 608, the control unit 101 clears errors for these operations. At step 609, a determination is made whether all the reads have been completed, since the requested virtual track instance may be stored on more than one of the N+M disk drives in a redundancy group. If all of the reads have not been completed, processing proceeds to step 614 where the control unit 101 waits for the next completion of a read operation by one of the N+M disk drives in the redundancy group. At step 615 the next reading disk drive has completed its operation and a determination is made whether there are any errors in the read operation that has just been completed. If there are errors, at step 616 the errors are marked and control proceeds back to the beginning of step 609 where a determination is made whether all the reads have been completed. If at this point all the reads have been completed and all portions of the virtual track instance have been retrieved from the redundancy group, then processing proceeds to step 610 where a determination is made whether there are any errors in the reads that have been completed. If errors are detected then at step 611 a determination is made whether the errors can be fixed. One error correction method is the use of a Reed-Solomon error detection/correction code to recreate the data that cannot be read directly. If the errors cannot be repaired then a flag is set to indicate to the control unit 101 that the virtual track instance can not be read accurately. If the errors can be fixed, then in step 612 the identified errors are corrected and processing returns back to the main routine at step 604 where a successful read of the virtual track instance from the redundancy group to the cache memory 113 has been completed.

At step 617, control unit 101 transfers the requested data record from the staged virtual track instance in which it is presently stored. Once the records of interest from the staged virtual track have been transferred to the host processor 11 that requested this information, then at step 618 the control unit 101 cleans up the read operation by performing the administrative tasks necessary to place all of the apparatus required to stage the virtual track instance from the redundancy group to the cache memory 113 into an idle state and control returns at step 619 to service the next operation that is requested.

Data Write Operation

Figure 7:
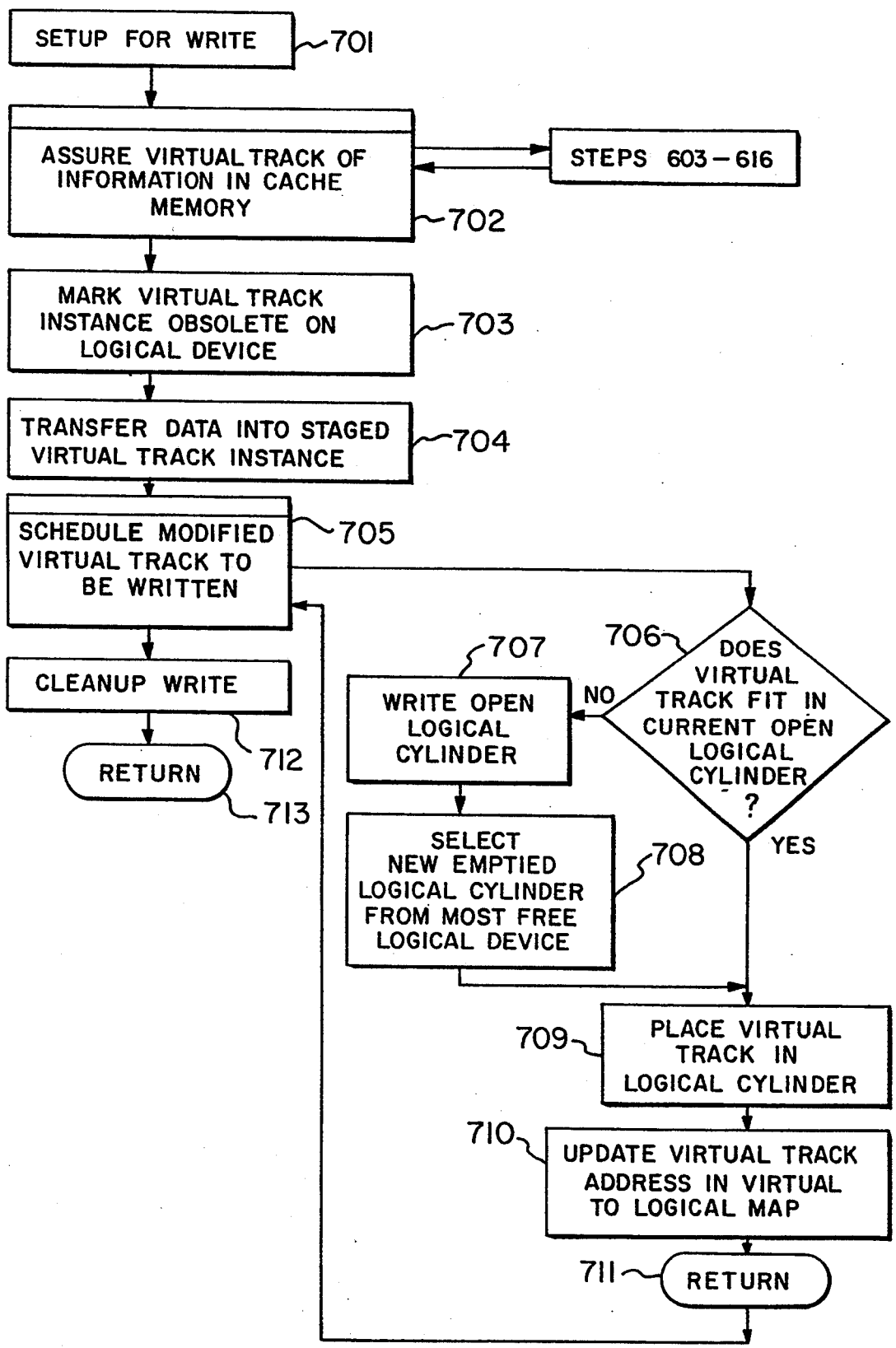

FIG. 7 illustrates in flow diagram form the operational steps taken by the disk drive array data storage subsystem 100 to perform a data write operation. The disk drive array data storage subsystem 100 supports writes of any size, but again, the logical layer only supports writes of virtual track instances. Therefore in order to perform a write operation, the virtual track that contains the data record to be rewritten is staged from the logical layer into the cache memory 113. Once the write operation is complete, the location of the obsolete instance of the virtual track is marked as free space. The modified data record is then transferred into the virtual track and this updated virtual track instance is then scheduled to be written from the cache memory 113 where the data record modification has taken place into the logical layer. Any clean up of the write operation is then performed once this transfer and write is completed some of the special handling required for sources and targets that was described earlier happens in this cleanup step. At step 701, the control unit 101 performs the set up for a write operation and at step 702, as with the read operation described above, the control unit 101 branches to the cache directory search subroutine to assure that the virtual track into which the data is to be transferred is located in the cache memory 113. Since all of the data updating is performed in the cache memory 113, the virtual track in which this data is to be written must be transferred from the redundancy group in which it is stored to the cache memory 113 if it is not already resident in the cache memory 113. The transfer of the requested virtual track instance to the cache memory 113 is performed for a write operation as it is described above with respect to a data read operation and constitutes steps 603-616 illustrated in FIG. 6 above.

At step 703, the control unit 101 marks the virtual track instance that is stored in the redundancy group as invalid in order to assure that the logical location at which this virtual track instance is stored is not accessed in response to another host processor 12 attempting to read or write the same virtual track. Since the modified record data is to be written into this virtual track in the cache memory 113, the copy of the virtual track that resides in the redundancy group is now inaccurate and must be removed from access by the host processors 11-12. At step 704, the control unit 101 transfers the modified record data received from host processor 11 into the virtual track that has been retrieved from the redundancy group into the cache memory 113 to thereby merge this modified record data into the original virtual track instance that was retrieved from the redundancy group. Once this merge has been completed and the virtual track now is updated with the modified record data received from host processor 11, the control unit 101 must schedule this updated virtual track instance to be written onto a redundancy group somewhere in the disk drive array data storage subsystem 100.

This scheduling is accomplished by the subroutine that consists of steps 706-711. At step 706, the control unit 101 determines whether the virtual track instance as updated fits into an available open logical cylinder. If it does not fit into an available open logical cylinder, then at step 707 then this presently open logical cylinder must be closed out and written to the physical layer and another logical cylinder selected from the most free logical device or redundancy group in the disk drive array data storage subsystem 100. At step 708, the selection of a free logical cylinder from the most free logical device takes place. This ensures that the data files received from host processor 11 are distributed across the plurality of redundancy groups in the disk drive array data storage subsystem 100 in an even manner to avoid overloading certain redundancy groups while underloading other redundancy groups. Once a free logical cylinder is available, either being the presently open logical cylinder or a newly selected logical cylinder, then at step 709, the control unit 101 writes the updated virtual track instance into the logical cylinder and at step 710 the new location of the virtual track is placed in the virtual to logical map in order to render it available to the host processors 11-12. At step 711, control returns to the main routine, where at step 712 the control unit 101 cleans up the remaining administrative tasks to complete the write operation and return to an available state at 712 for further read or write operations from host processor 11.

Free Space Collection

Figure 8:
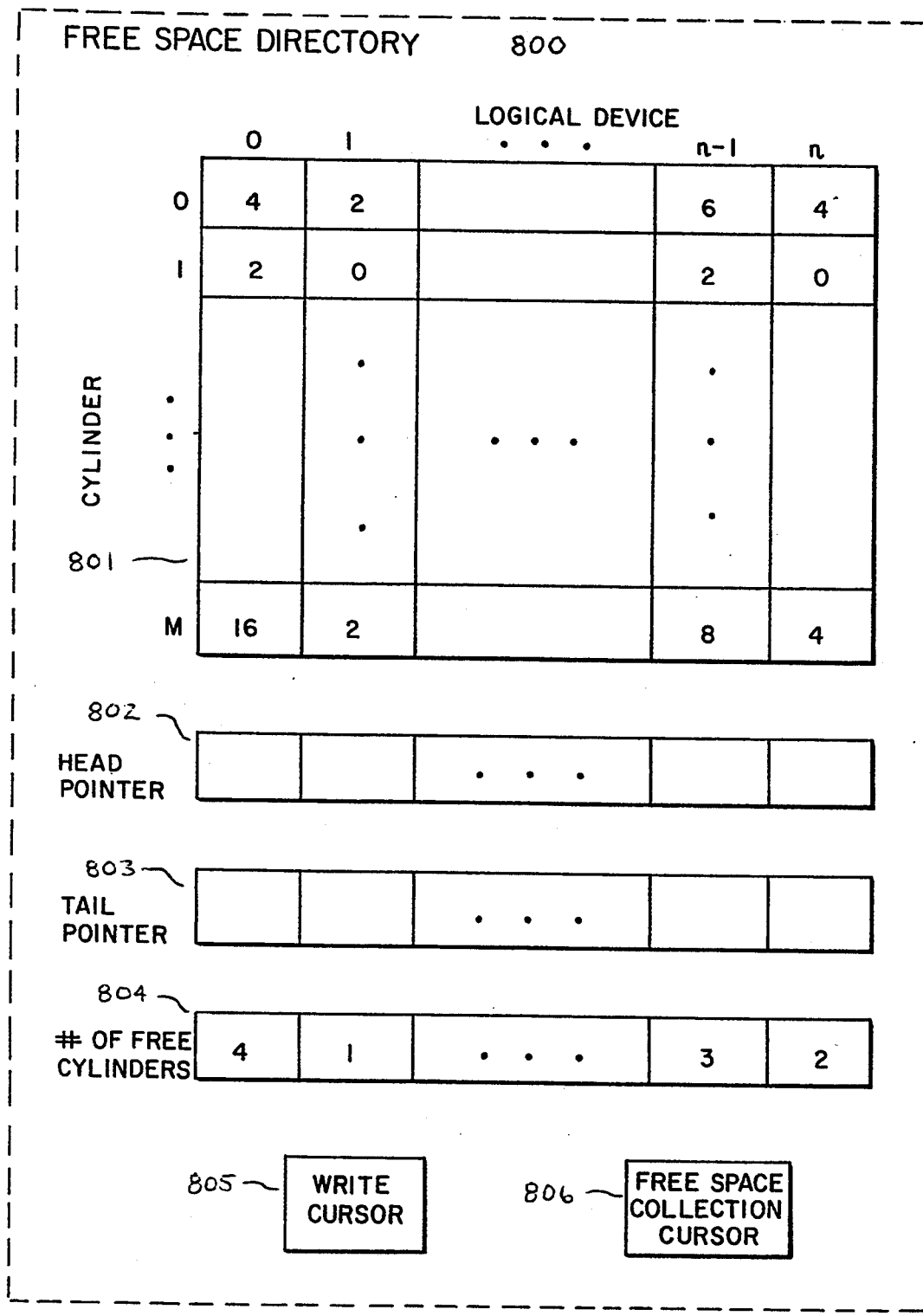
FIG. 8 illustrates a typical free space directory used in the data storage subsystem.

When data in cache memory 113 is modified, it cannot be written back to its previous location on a disk drive in disk drive subsets 103 since that would invalidate the redundancy information on that logical track for the redundancy group. Therefore, once a virtual track has been updated, that track must be written to a new location in the data storage subsystem 100 and the data in the previous location must be marked as free space. Therefore, in each redundancy group, the logical cylinders become riddled with "holes" of obsolete data in the form of virtual track instances that are marked as obsolete. In order to completely empty logical cylinders for destaging, the valid data in partially valid cylinders must be read into cache memory 113 and rewritten into new previously emptied logical cylinders. This process is called free space collection. The free space collection function is accomplished by control unit 101. Control unit 101 selects a logical cylinder that needs to be collected as a function of how much free space it contains. The free space determination is based on the free space directory as illustrated in FIG. 8, which indicates the availability of unused memory in data storage subsystem 100. The table illustrated in FIG. 8 is a listing of all of the logical devices contained in data storage subsystem 100 and the identification of each of the logical cylinders contained therein. The entries in this chart represent the number of free physical sectors in this particular logical cylinder. A write cursor is maintained in memory and this write cursor indicates the available open logical cylinder that control unit 101 will write to when data is destaged from cache 113 after modification by associated host processor 11-12 or as part of a free space collection process. In addition, a free space collection cursor is maintained which points to the present logical cylinder that is being cleared as part of a free space collection process. Therefore, control unit 101 can review the free space directory illustrated in FIG. 8 as a backend process to determine which logical cylinder on a logical device would most benefit from free space collection. Control unit 101 activates the free space collection process by reading all of the valid data from the selected logical cylinder into cache memory 113. The logical cylinder is then listed as completely empty, since all of the virtual track instances therein are tagged as obsolete. Additional logical cylinders are collected for free space collection purposes or as data is received from an associated host processor 11-12 until a complete logical cylinder has been filled. Once a complete logical cylinder has been filled, a new previously emptied logical cylinder is chosen.

Figure 9:
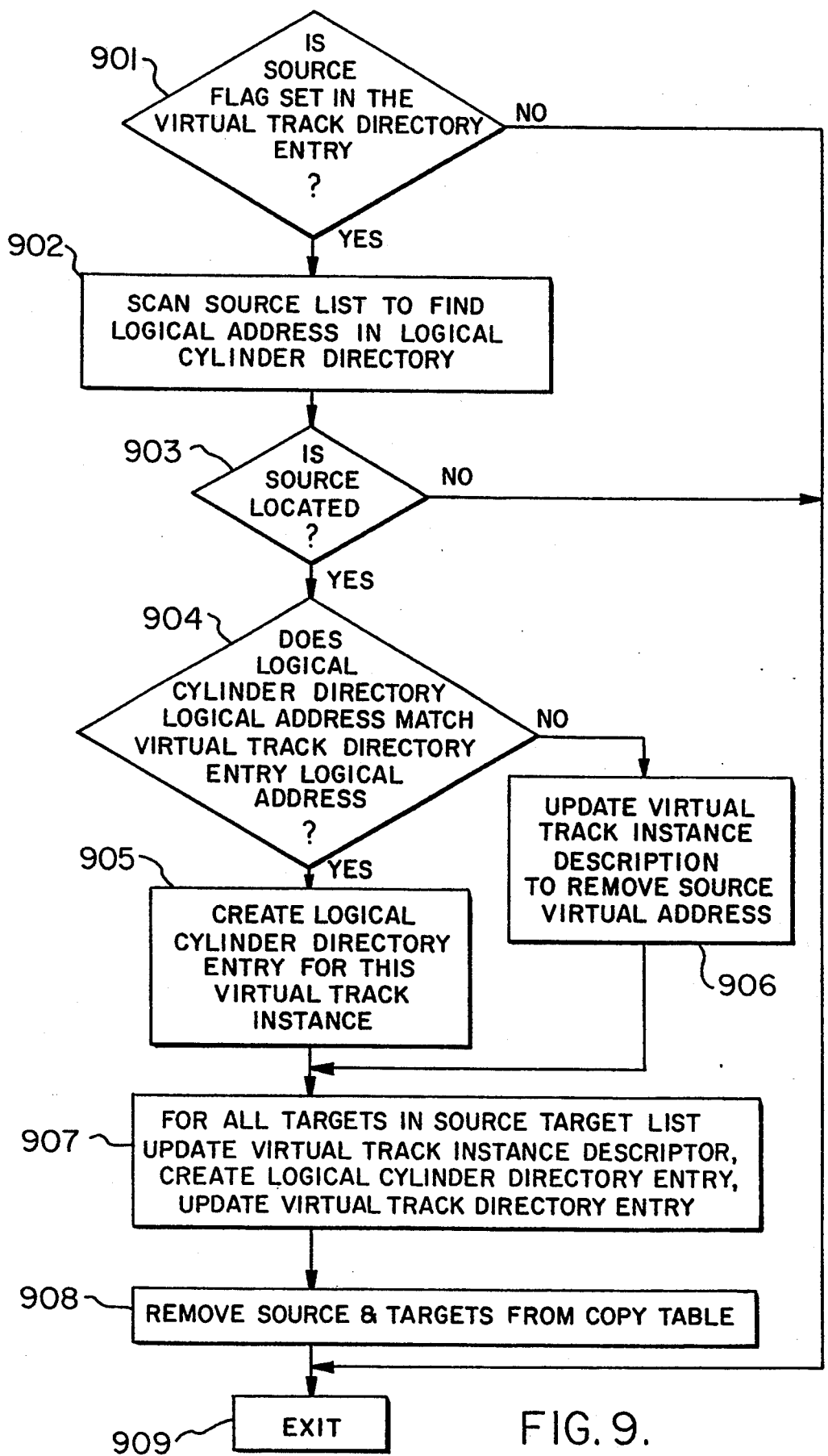
FIG. 9 illustrates, in flow diagram form, the free space collection process.

FIG. 9 illustrates in flow diagram form the operational steps taken by processor 204 to implement the free space collection process. The use of Source and Target Flags is necessitated by the free space collection process since this process must determine whether each virtual track instance contains valid or obsolete data, In addition, the free space collection process performs the move/copy count field adjustment operations listed in the copy table. The basic process is initiated at step 901 when processor 204 selects a logical cylinder for collection based on the number of free logical sectors as listed in the table of FIG. 8. Processor 204 checks each virtual track directory entry to determine if the Source Flag is set. If not, the process exits at step 909 to the next virtual track. If the Source Flag is set, at step 902 processor 204 scans the source list to find the logical address in the logical cylinder directory. If no address is found, this virtual track instance is an obsolete version and is no longer needed (invalid). This data is not relocated.

If the address is found, at step 904, processor 204 compares the logical cylinder directory logical address with the virtual track directory entry logical address. If there is a match, processor 204 creates a logical cylinder directory entry for this virtual track instance. If there is not a match, the Source has been updated and exists elsewhere. Processor 204 at step 906 updates the virtual track instance descriptor to remove the source virtual address. Upon completion of either step 905 or 906, processor 204 at step 907 for all Targets in this Source's Target List updates the virtual track instance descriptor to include this virtual address and the update count fields flag from the Copy Table. In addition, processor 204 creates a logical cylinder directory entry for this virtual track instance. Finally, processor 204 updates the virtual track directory entry for the Target to point to the new location and to clear the Target Flag. Processor 204 at step 908 removes this Source and all its Targets from the Copy Table. Processor 204 also scans the Copy Table for Sources with the same virtual address and clears the Source Flag. The changes to the virtual track directory and to the Copy Table are then journaled.

While a specific embodiment of this invention has been disclosed herein, it is expected that those skilled in the art can design other embodiments that differ from this particular embodiment but fall within the scope of the appended claims.

We claim:

1. A disk memory system for storing data records for at least one data processor comprising:
a plurality of disk drives;
means, responsive to the receipt of a stream of data records from said data processor, for selecting available memory space in said disk drives to store said received stream of data records thereon;
means for writing said received stream of data records in said selected available memory space;
means, responsive to said writing means, for generating a data record pointer for each of said data records in said stream of data records identifying the physical memory location of said data record;
means, responsive to the subsequent receipt of a data record copy request identifying one of said data records stored in said disk drives, for copying said identified data record including:
means for identifying the physical memory location of the requested data record as specified by its data record pointer,
means for generating a data record pointer that is duplicative of said data record pointer as the data record pointer for said copy of said requested data record,
means for identifying said duplicative data record pointer as a pointer to a copy of said requested data record, and
means for maintaining data indicative that both said data record pointer and said duplicative data record pointer point to said requested data record.

2. The disk memory system of claim 1 further comprising:
memory means for storing each said duplicate data record pointer and said data record pointer.

3. The disk memory system of claim 2 wherein multiple copies of a data record can be created, each said copy having a duplicate data record pointer, said maintaining means includes:
means for creating a ring for each of said data record pointers with all their said duplicate data record pointers.

4. The disk memory system of claim 3 wherein said copying means further includes:
means, responsive to a generation of a next duplicate data record pointer, for inserting said next duplicate data record pointer into a one of said rings of data record pointers including said data record pointer.

5. The disk memory system of claim 3 wherein said copying means further includes:
means, responsive to said disk memory system writing a data record identified by one of said duplicate data record pointers in a selected available memory space, for deleting said one duplicate data record pointer from said ring of data record pointers.

6. The disk memory system of claim 5 wherein said copying means further includes:
means, responsive to a deletion of said one duplicate data record pointers, for deleting said data record pointer from said ring of data record pointers when no further duplicate data record pointers are associated with said data record pointer.

7. The disk memory system of claim 1 further comprising:
means for storing each of said data record pointers in a table;
means for including said duplicate data record pointer in said table; and
means for appending data to said stored data record pointer indicative of a location in said table of said duplicate data record pointer.

8. The disk memory system of claim 7 wherein said copying means further includes:
means, responsive to a generation of a next duplicate data record pointer whose data record pointer is already associated with a duplicate data record pointer stored in said table, for including said next duplicate data record pointer in said table; and
means for updating a list of said duplicate data record pointers referring back to said data record pointer to indicate a location in said table of said next duplicate data record pointer.

9. The disk memory system of claim 8 wherein said copying means further includes:
means, responsive to said disk memory system writing a data record identified by one of said duplicate data record pointers in a selected available memory space, for deleting said one duplicate data record pointer from said table.

10. The disk memory system of claim 9 wherein said copying means further includes:
means, responsive to a deletion of said one duplicate data record pointers, for deleting said appended data from said stored data record pointer indicative of a location in said table of said deleted duplicate data record pointer.

11. A method in a disk memory system for storing data records for at least one data processor, wherein said disk memory system includes a plurality of disk drives, which selects, in response to the receipt of a stream of data records from said data processor, available memory space to store said received stream of data records thereon and writes said received stream of data records in said selected available memory space, said method comprising the steps of:
generating a data record pointer for each of said data records in said stream of data records identifying the physical memory location of said data record;
copying, in response to the subsequent receipt of a data record copy request identifying one of said data records stored in said disk drives, said identified data record including:
identifying the physical memory location of the requested data record as specified by its data record pointer,
generating a data record pointer that is duplicate of said data record pointer as the data record pointer for said copy of said requested data record,
identifying said duplicative data record pointer as a pointer to a copy of said requested data record, and
maintaining data indicative that both said data record pointer and said duplicative data record pointer point to said requested data record.

12. The method of claim 11 further comprising the steps of:
storing said generated data record pointers; and
storing in a memory each said generated duplicate data record pointer and said data record pointer.

13. The method of claim 12 wherein multiple copies of a data record can be created, each said copy having a duplicate data record pointer, said step of maintaining includes:
creating rings of said data record pointers with their said duplicate data record pointers for all said duplicate data record pointers.

14. The method of claim 13 wherein said step of copying further includes:
inserting, in response to a generation of a next duplicate data record pointer, said next duplicate data record pointer to a one of said rings including said data record pointer.

15. The method of claim 13 wherein said step of copying further includes:
deleting, in response to said disk memory system writing a data record identified by one of said duplicate data record pointers in a selected available memory space, said one duplicate data record pointer from said ring.

16. The method of claim 15 wherein said step of copying further includes:
deleting, in response to a deletion of said one duplicate data record pointers, said data record pointer from said ring of data record pointers when no further duplicate data record pointers are associated with said data record pointer.

17. The method of claim 11 further comprising the steps of:
storing each of said generated data record pointers in a table;
including said duplicate data record pointer in said table; and
appending data to said stored data record pointer indicative of a location in said table of said duplicate data record pointer.

18. The method of claim 17 wherein said step of copying further includes:
including, in response to a generation of a next duplicate data record pointer whose data record pointer is already associated with a duplicate data record pointer stored in said table, said next duplicate data record pointer in said table; and
updating a list of said duplicate data record pointers referring back to said data record pointer to indicate a location in said table of said next duplicate data record pointer.

19. The method of claim 18 wherein said step of copying further includes:
deleting, in response to said disk memory system writing a data record identified by one of said duplicate data record pointers in a selected available memory space, said one duplicate data record pointer from said table.

20. The method of claim 19 wherein said step of copying further includes:
deleting, in response to a deletion of said one duplicate data record pointers, said appended data from said stored data record pointer indicative of a location in said table of said deleted duplicate data record pointer.

21. A disk memory system for storing data records that are accessible by at least one data processor comprising:
a plurality of disk drives for storing data thereon, a number of said disk drives being configured into at least two redundancy groups, each said redundancy group including n+m of said plurality of disk drives, where n and m are both positive integers with n greater than 1 and m equal to or greater than 1;
means for storing each stream of data records received from said data processor on successive ones of said n disk drives in a selected redundancy group;
means, responsive to said storing means storing streams of data records on all n disk drives in said selected redundancy group, for generating m segments of data redundancy information for said data records stored on said n disk drives;
means for writing said m segments of redundancy data on to said m disk drives of said selected redundancy group;
means, responsive to said writing means, for generating a data record pointer for each of said data records in said stream of data records identifying the physical memory location of said data record in said redundancy group;
means, responsive to the subsequent receipt of a data record copy request identifying one of said data records stored in one of said redundancy groups, for copying said identified data record, including:
means for identifying the physical memory location of the requested data record as specified by its data record pointer,
means for generating a data record pointer that is duplicate of said data record pointer as the data record pointer for said copy of said requested data record,
means for identifying said duplicative data record pointer as a pointer to a copy of said requested data record, and
means for maintaining data indicative that both said data record pointer and said duplicative data record pointer point to said requested data record.

22. The disk memory system of claim 21 further comprising:
means for storing said generated data record pointers; and
memory means for storing each said generated duplicate data record pointer and said data record pointer.

23. The disk memory system of claim 21 wherein multiple copies of a data record can be created, each said copy having a duplicate data record pointer, said maintaining means includes:
means for creating rings of said data record pointers with their said duplicate data record pointers for all said duplicate data record pointers.

24. The disk memory system of claim 23 wherein said copying means further includes:
means, responsive to a generation of a next duplicate data record pointer, for inserting said next duplicate data record pointer into a one of said rings including said data record pointer.

25. The disk memory system of claim 22 wherein said copying means further includes:
means, responsive to said disk memory system writing a data record identified by one of said duplicate data record pointers in a selected available memory space in a selected redundancy group, for deleting said one duplicate data record pointer from said rings.

26. The disk memory system of claim 24 wherein said copying means further includes:
means, responsive to a deletion of said one duplicate data record pointers, for deleting said associated data record pointer from said ring of data record pointers when no further duplicate data record pointers are associated with said data record pointer.

27. The disk memory system of claim 21 further comprising:
means for storing each of said generated data record pointers in a table;
means for including said duplicate data record pointer in said table; and
means for appending data to said stored data record pointer indicative of a location in said table of said duplicate data record pointer.

28. The disk memory system of claim 27 wherein said copying means further includes:
means, responsive to a generation of a next duplicate data record pointer whose data record pointer is already associated with a duplicate data record pointer stored in said table, for including said next duplicate data record pointer in said table; and
means for updating a last of said duplicate data record pointers referring back to said data record pointer to indicate a location in said table of said next duplicate data record pointer.

29. The disk memory system of claim 28 wherein said copying means further includes:
means, responsive to said disk memory system writing a data record identified by one of said duplicate data record pointers in a selected available memory space in a selected redundancy group, for deleting said one duplicate data record pointer from said table.

30. The disk memory system of claim 29 wherein said copying means further includes:
means, responsive to a deletion of said one duplicate data record pointers, for deleting said appended data from said stored data record pointer indicative of a location in said table of said deleted duplicate data record pointer.

31. A method in a disk memory system for storing data records that are accessible by at least one data processor, wherein said disk memory system includes a plurality of disk drives for storing data thereon, a number of said disk drives being configured into at least two redundancy groups, each said redundancy group including n+m of said plurality of disk drives, where n and m are both positive integers with n greater than 1 and m equal to or greater than 1, wherein each stream of data records received from said data processor are stored on successive ones of said n disk drives in a selected redundancy group and m segments of data redundancy information are generated for said data records stored on said n disk drives and said m segments of redundancy data are written on to said m disk drives of said selected redundancy group, said method comprising the steps of:

generating a data record pointer for each of said data records in said stream of data records identifying the physical memory location of said data record in said redundancy group;

copying, in response to the subsequent receipt of a data record copy request identifying one of said data records stored in one of said redundancy groups, said identified data record, including:

identifying the physical memory location of the requested data record as specified by its associated data record pointer, generating a data record pointer that is duplicate of said data record pointer as the data record pointer for said copy of said requested data record, identifying said duplicative data record pointer as a pointer to a copy of said requested data record, and maintaining data indicative that both said data record pointer and said duplicative data record pointer point to said requested data record.

32. The method of claim 31 further comprising the steps of:

storing said generated data record pointers; and storing in a memory each said generated duplicate data record pointer and said data record pointer.

33. The method of claim 32 wherein multiple copies of a data record can be created, each said copy having a duplicate data record pointer, said step of maintaining includes:

creating rings of said data record pointers with their said duplicate data record pointers for all said duplicate data record pointers.

34. The method of claim 33 wherein said step of copying further includes:

inserting, in response to a generation of a next duplicate data record pointer, said next duplicate data record pointer to a one of said rings including said data record pointer.

35. The method of claim 33 wherein said step of copying further includes:

deleting, in response to said disk memory system writing a data record identified by one of said duplicate data record pointers in a selected available memory space in a selected redundancy group, said one duplicate data record pointer from said rings.

36. The method of claim 35 wherein said step of copying further includes:

deleting, in response to a deletion of said one duplicate data record pointers, said data record pointer from said ring of data record pointers when no further duplicate data record pointers are associated with said data record pointer.

37. The method of claim 31 further comprising the steps of:

storing each of said generated data record pointers in a table;

including said duplicate data record pointer in said table; and appending data to said stored data record pointer indicative of a location in said table of said duplicate data record pointer.

38. The method of claim 37 wherein said step of copying further includes:

including, in response to a generation of a next duplicate data record pointer whose data record pointer is already associated with a duplicate data record pointer stored in said table, said next duplicate data record pointer in said table; and updating a last of said duplicate data record pointers referring back to said data record pointer to indicate a location in said table of said next duplicate data record pointer.

39. The method of claim 38 wherein said step of copying further includes:

deleting, in response to said disk memory system writing a data record identified by one of said duplicate data record pointers in a selected available memory space in a selected redundancy group, said one duplicate data record pointer from said table.

40. The method of claim 39 wherein said step of copying further includes:

deleting, in response to a deletion of said one duplicate data record pointers, said appended data from said stored data record pointer indicative of a location in said table of said deleted duplicate data record pointer.

* * * * *